Oct. 5, 1937.   C. A. SABBAH   2,094,821
ELECTRIC VALVE CONVERTING SYSTEM
Filed July 8, 1936
Fig. 1.
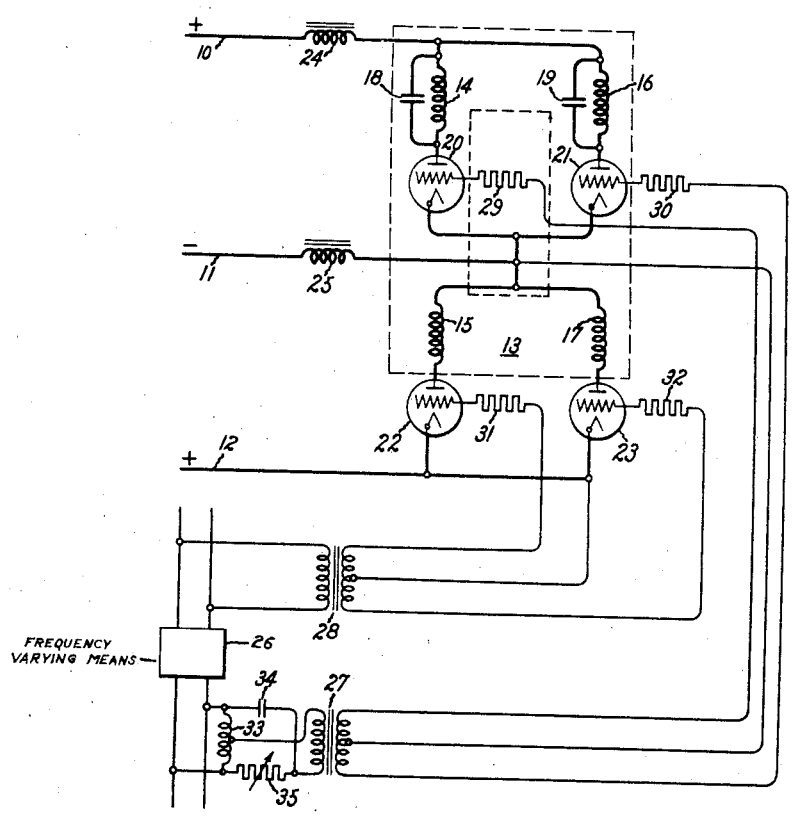
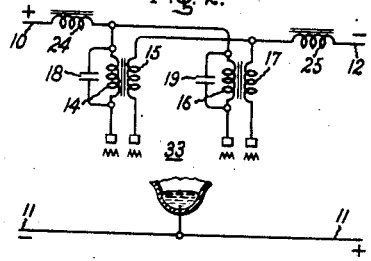
Fig. 2.
Inventor:
Camil A. Sabbah, Deceased
by William A. Dodge, Administrator
by Harry E. Dunham
Attorney.

Patented Oct. 5, 1937

2,094,821

UNITED STATES PATENT OFFICE 2,094,821

ELECTRIC VALVE CONVERTING SYSTEM

Camil A. Sabbah, deceased, late of Schenectady, N. Y., by William A. Dodge, administrator, Schenectady, N. Y., assignor to General Electric Company, a corporation of New York Application July 8, 1936, Serial No. 89,593

9 Claims. (Cl. 171—97)

This invention relates to electric valve converting systems and more particularly to such systems suitable for transferring energy from one direct current circuit to another.

An electric valve converting system suitable for transferring energy between constant potential and constant current direct current circuits is disclosed in United States Letters Patent No. 1,961,080 granted May 29, 1934, upon the application of C. A. Sabbah. The apparatus disclosed therein utilizes a three-legged reactor having inductive windings on the several legs thereof and an energy storage device or capacitor associated with at least a portion of the inductive winding on each leg.

One of the objects of this invention is to provide an improved electric valve converting system of this type utilizing a minimum of apparatus and which will be simple and reliable in operation.

The novel features which are believed to be characteristic of this invention are set forth with particularity in the appended claims. The invention itself, however, both as to its organization and method of operation, together with further objects and advantages thereof, will be better understood by reference to the following description taken in connection with the accompanying drawing in which Fig. 1 represents the preferred embodiment of the invention and Fig. 2 is a modification of the invention utilizing a multi-anode single-cathode electric discharge valve.

Referring now more particularly to Fig. 1 of the drawing, there is illustrated an electric valve converting system for transferring energy between a constant potential direct current circuit 10, 11 and a constant current direct current circuit 11, 12, said circuits having a common terminal 11. This system is provided with an energy storage and transfer device comprising a two-legged magnetic core structure 13 represented by dotted lines and having a pair of inductive windings 14, 15; and 16, 17 on each leg thereof, each pair of inductive windings being provided with an energy storage device which may be in the form of capacitors 18 and 19. One of the windings of each pair of windings is associated with an energy storage device such as capacitors 18 and 19 which may be connected in parallel with windings 14 and 16 respectively. One terminal of each of the windings 14 and 16 is connected directly to one side of the constant potential direct current circuit 10, 11 and the other terminal of these windings is connected by means of the pair of valves 20, 21 to the other side of the constant potential direct current circuit 10, 11. The remaining windings 15 and 17 are each connected with one terminal to one side of the constant current direct current circuit 11, 12 and with the remaining terminal to the other side of the constant direct current circuit 11, 12 by means of the electric valves 22, 23. In order to prevent any reaction between the electric valve converting apparatus 10 and the direct current circuit, the smoothing inductors 24, 25 may be connected between the apparatus and the line conductors 10, 11. While each of the valves 20, 21, 22 and 23 is shown as being provided with an anode, a cathode and a control grid, these valves may be any of the several types well known in the art, although it is preferable to utilize valves of the type containing an ionizable medium and which are provided with control or starting electrodes whereby the discharge paths between the anodes and cathodes may be controlled. The control electrodes or grids of the valves 20, 21, 22 and 23 are energized from a suitable source of alternating current 26 by means of transformers 27 and 28. The source of alternating current 26 is preferably derived from a generator or an oscillator, the frequency of which may be readily varied. In accordance with the customary practice the value of the grid current in the control circuit may be limited by inserting therein the resistors 29, 30, 31 and 32. In order to provide a means for controlling the phase relation between the alternating potential impressed upon the grid circuits of the valves 22 and 23 and that impressed upon the grid circuits of the valves 20 and 21 a phase shifting circuit comprising a reactor 33, a capacitor 34 and a variable resistor 35 is interposed between the transformer 27 and the alternating current source 26. While there is shown a plurality of valves, it will be apparent to those skilled in the art that a double-anode, single-cathode valve may be used to replace the valves 21 and 22 and likewise another such valve could be substituted for valves 22 and 23.

In operation, neglecting the leakage reactance between the windings common to each leg of the device 13, the windings and capacitors associated with this core structure serve to maintain the total magnetomotive force and that of each of the legs of the magnetic core structure 13 at a substantially constant value. Each of the valves is conductive for a period equal to 180 electrical degrees. During the time that electric valve 20 is conductive electrical energy is stored in the circuit comprising the inductor winding 14 and the capacitor 18. After the electric valve 20 has been conductive for 180 electrical degrees the current is transferred from this valve to valve 21 which now causes energy to be stored in the inductor winding 16 and the capacitor 19. By means of the phase shift circuit, the time of the initiation of conductivity of the valves 20 and 21 is so arranged that each of these valves becomes conductive some time after valves 22 and 23, respectively, were rendered conductive. This time interval may be any value slightly greater than zero degrees and slightly less than 180 degrees. It will be obvious, of course, to those skilled in the art that the system will not operate satisfactorily when the time of ignition of valve 20 is either in phase with the ignition of valve 22 or exactly out of phase with valve 22 because of the constant current output characteristic of the apparatus. It is believed that the above explanation presents in accordance with present knowledge the most likely theory of operation of the circuit arrangement disclosed herein, although there may be other explanations and the above is not to be construed in a limiting sense.

The size of the capacitors 18, 19, the ratio of the windings 14, 16 to their respective associated windings 15, 17, the phase relation between the control potentials applied to the pairs of valves 20, 21, and 22, 23, and the frequency of the alternating current circuit 26 all determine the amount of power transferred between the direct current circuits. By providing means (not shown) for varying the frequency of the source of potential 26, the value of the energy transferred between the two circuits may be readily controlled. While the operation of the circuit disclosed has been described in terms of transferring power from the constant potential direct current circuits 10, 11 to the constant current circuits 11, 12, it will be apparent to those skilled in the art that energy may be transferred from the constant current direct current circuit to the constant potential direct current circuit.

In Fig. 2 there is disclosed an arrangement utilizing a four-anode, single-cathode electric valve discharge device 33 in place of the four individual electric valves of Fig. 1. Since the remaining components of the system are identical to that disclosed in Fig. 1 they have been given like reference numerals. It will be noted, however, that the conductor 12 in Fig. 2 is now connected to the inductive windings 15 and 17 whereas in Fig. 1 the conductor 12 was connected to the cathodes of the valves 22 and 23. It will be remembered, however, that in connection with the description of Fig. 1 it was stated that the inductive windings 15 and 17 need only be connected to the constant current circuit 11, 12 by means of conductive connections and the equivalent of the electric valves 22 and 23. Since the same control electrode circuit of Fig. 1 may be utilized in the control of the discharge valve 33 of Fig. 2 this control circuit has been indicated very schematically by the grids but the detail grid circuits have been omitted.

The operation of the embodiment of the invention disclosed in Fig. 2 is substantially in accordance with the principles of operation set forth in detail in connection with the description of Fig. 1 and therefore it is believed the further description is unnecessary for a complete understanding of this embodiment of the invention.

While this invention has been shown and described in connection with certain specific embodiments it will, of course, be understood that it is not to be limited thereto, since it is apparent that the principles herein disclosed are susceptible of numerous other applications, and modifications may be made in the circuit arrangements and in the instrumentalities employed without departing from the spirit and scope of the invention as set forth in the appended claims.

What is claimed as new and desired to be secured by Letters Patent of the United States is:

1. An electric valve converting system for transferring energy between two circuits comprising a two-legged magnetic core structure having at least one inductive winding on each leg, an energy storage device associated with each leg to maintain a substantially constant magneto-motive force in said structure, electric valve means interconnecting said windings of said structure with said circuits, and means for controlling the conductivity of said valve means.

2. An electric valve converting system for transmitting energy between two circuits, one of which has a constant current characteristic, comprising a two-legged magnetic core structure provided with a winding for each leg, a capacitor for each winding connected in parallel thereto, means including an electric discharge valve means interconnecting the windings of said structure with said circuits, and means for controlling the sequence and the frequency of the conductivities of said valve means.

3. An electric valve converting system comprising direct current input and output circuits, a two-legged core structure provided with a pair of windings on each leg, electric discharge valve means interconnecting one winding of each of said pair of windings with one of said direct current circuits, other electric discharge valve means interconnecting the remaining windings with the other of said direct current circuits, a capacitor for each of the windings associated with one of said circuits, said capacitors being connected in parallel with their respective windings, and means for controlling the conductivities of said valve means.

4. An electric valve converting system comprising direct current input and output circuits, one of said circuits having a constant potential characteristic and the other a constant current characteristic, a two-legged magnetic core structure provided with a pair of windings on each leg, electric discharge valve means interconnecting one of the windings on each leg with one of said circuits and the remaining winding on each leg with the other of said circuits, a capacitor connected across each winding associated with said constant potential circuit, and means for controlling the conductivities of said valve means.

5. An electric valve converting system for transferring energy between two circuits, one of said circuits being a constant current circuit, comprising a two-legged magnetic core structure having at least one inductive winding on each leg thereof, an energy storage device associated with the inductive winding on each leg to maintain a substantially constant magnetomotive force in said structure, electric valve means interconnecting said windings of said structure with said circuits, means for controlling the conductivity of said valve means, and means for controlling the frequency at which said valve means become conductive.

6. An electric valve converting system comprising direct current input and output circuits, a two-legged core structure provided with a pair of windings on each leg, electric discharge valve means interconnecting one winding of each of said pair of windings with one of said direct current circuits, other electric discharge valve means interconnecting the remaining windings with the other of said direct current circuits, a capacitor for each of the windings associated with one of said circuits, said capacitors being connected in parallel with their respective windings, and means for alternately initiating the conductivities of the valve means associated with each leg of said structure.

7. An electric valve converting system for transferring energy between a constant potential direct current circuit and a constant current direct current circuit comprising a two-legged magnetic core structure, a pair of windings for each leg thereof, a plurality of energy storage devices each associated with one of the windings of each leg, means including an electric discharge valve means for each winding of said structure for interconnecting said windings with said circuits, and means for alternately initiating the conductivities of the valve means associated with each leg of said structure and for controlling the time interval between said initiations of conductivity.

8. An electric valve converting system for transferring energy between a constant potential direct current circuit and a constant current direct current circuit comprising a two-legged magnetic core structure, a pair of windings for each leg thereof, a plurality of energy storage devices each associated with one of the windings of each leg, means including electric discharge valve means for interconnecting each of said windings with said circuits, and means for alternately initiating the periods of conductivity of the valve means associated with each leg so that said periods are concurrent for a portion of each cycle of operation.

9. An electric valve converting system for transmitting energy between direct current circuits, said system having input and output circuits one of which has a constant current characteristic, comprising a two-legged magnetic core structure provided with a pair of windings for each leg, a capacitor connected in parallel with one winding of each leg, electric discharge valve means provided with control electrodes and interconnecting the windings of said structure with said direct current circuits, means for alternately energizing the control electrodes of the valve means associated with the windings on each leg of said structure, and means for controlling the frequency of the energization of said control electrodes.

WILLIAM A. DODGE,
*Administrator of the Estate of Camil A. Sabbah, Deceased.*